(12) United States Patent
Steger

(10) Patent No.: US 12,517,382 B2
(45) Date of Patent: Jan. 6, 2026

(54) ELASTOMER BELLOWS WITH LOW-PROFILE MOUNTING FEATURES

(71) Applicant: Stephen Andrew Steger, Los Angeles, CA (US)

(72) Inventor: Stephen Andrew Steger, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 896 days.

(21) Appl. No.: 17/825,095

(22) Filed: May 26, 2022

(65) Prior Publication Data

US 2023/0384622 A1    Nov. 30, 2023

(51) Int. Cl.
    *G02C 11/00* (2006.01)
    *G02B 27/01* (2006.01)

(52) U.S. Cl.
    CPC .......... *G02C 11/12* (2013.01); *G02B 27/0176* (2013.01)

(58) Field of Classification Search
    CPC ...... G02C 5/18; G02C 11/12; G02C 2200/04; G02B 27/0176
    USPC ........................................................ 351/117
    See application file for complete search history.

(56) References Cited

U.S. PATENT DOCUMENTS 5,001,862 A * 3/1991 Albenda ................. E06B 7/367
                                                       49/383
6,055,705 A * 5/2000 Komatsu .................. E05D 1/02
                                                       16/225

2007/0000092 A1    1/2007 Geffe
2023/0258956 A1 *  8/2023 Wang .................... G02C 11/10
                                                       351/153

FOREIGN PATENT DOCUMENTS

KR      20140092124 A      7/2014
KR      20150003577 U    10/2015

OTHER PUBLICATIONS

International Search Report and Written Opinion for International Application No. PCT/US2023/023388, dated Sep. 8, 2023 (Aug. 9, 2023)—9 pages.

* cited by examiner

*Primary Examiner* — Henry Duong
(74) *Attorney, Agent, or Firm* — CM Law; Stephen J. Weed

(57) ABSTRACT

A movable assembly with an elastomer bellows forming a cosmetic covering and providing ingress protection of a dynamic opening between a pair of enclosures. On one side of the dynamic opening, the bellows is secured to an enclosure by protrusions of that enclosure that extend into mating openings in the bellows and a retainer that engages those protrusions. An adhesive secures the protrusions to the retainer to form a secure clamped connection of the bellows to the enclosure. On the other side of the dynamic opening, the bellows is secured to another enclosure without the use of fasteners or adhesives. Teeth in openings of the second enclosure are secured in a recessed channel of the bellows created by a protrusion and a flange. As the two enclosures move relative to one another, the bellows is stretched and compressed such that the dynamic opening between the two enclosures is cosmetically covered with ingress protection.

15 Claims, 8 Drawing Sheets

ELASTOMER BELLOWS WITH LOW-PROFILE MOUNTING FEATURES

TECHNICAL FIELD

The present subject matter relates to a bellows for covering an opening between two moving parts.

BACKGROUND

Bellows are used in various applications to protect moving parts from debris, dust, and/or humidity. The bellows are extendable and often need to be low-profile.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1A:
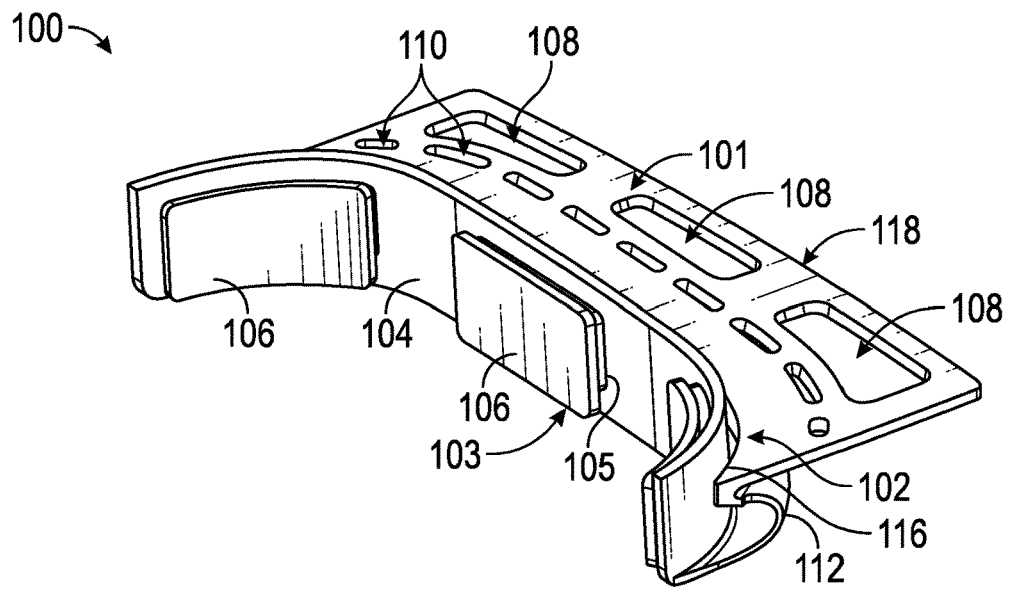
Figure 1B:
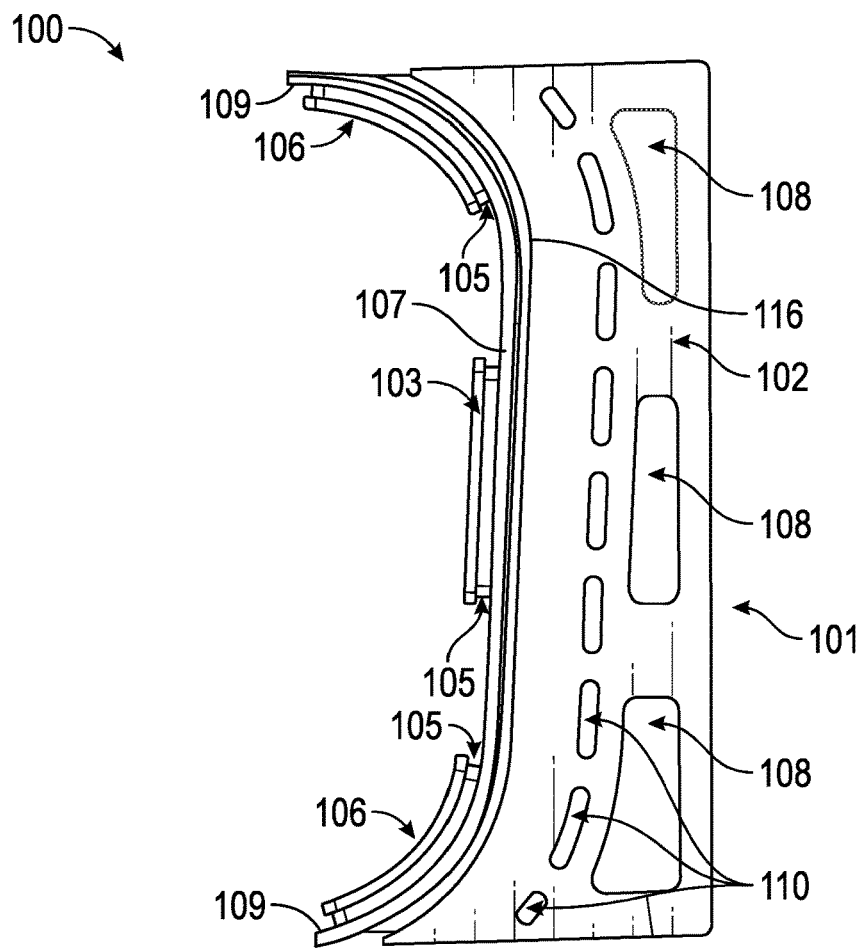
Figure 1C:
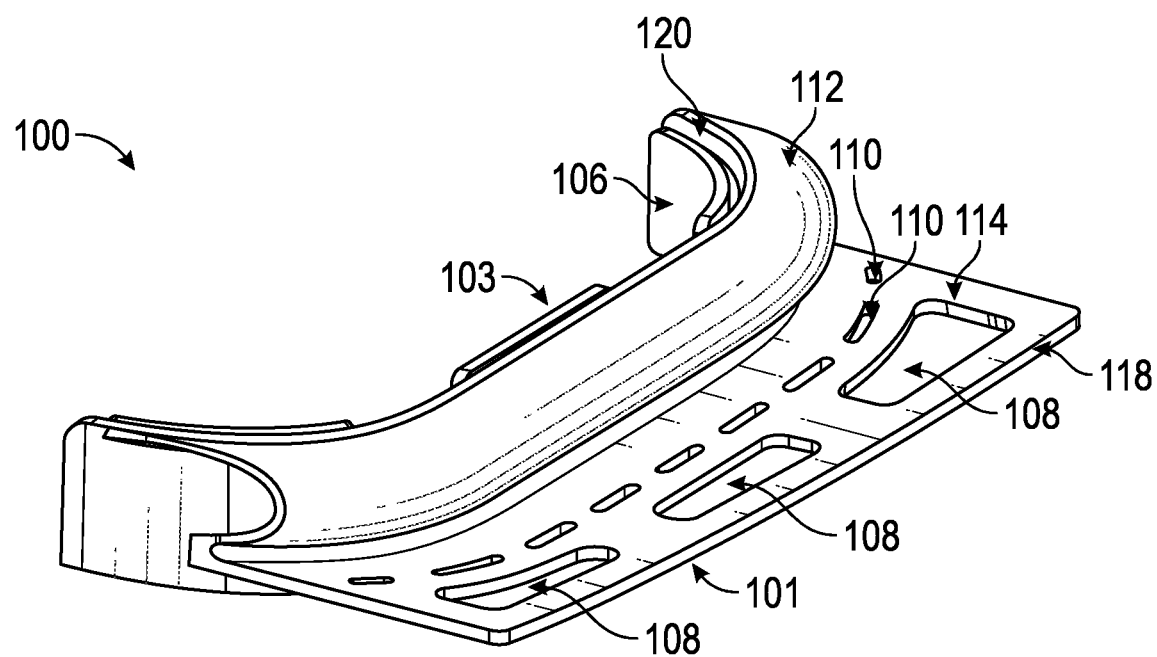
Figure 2A:
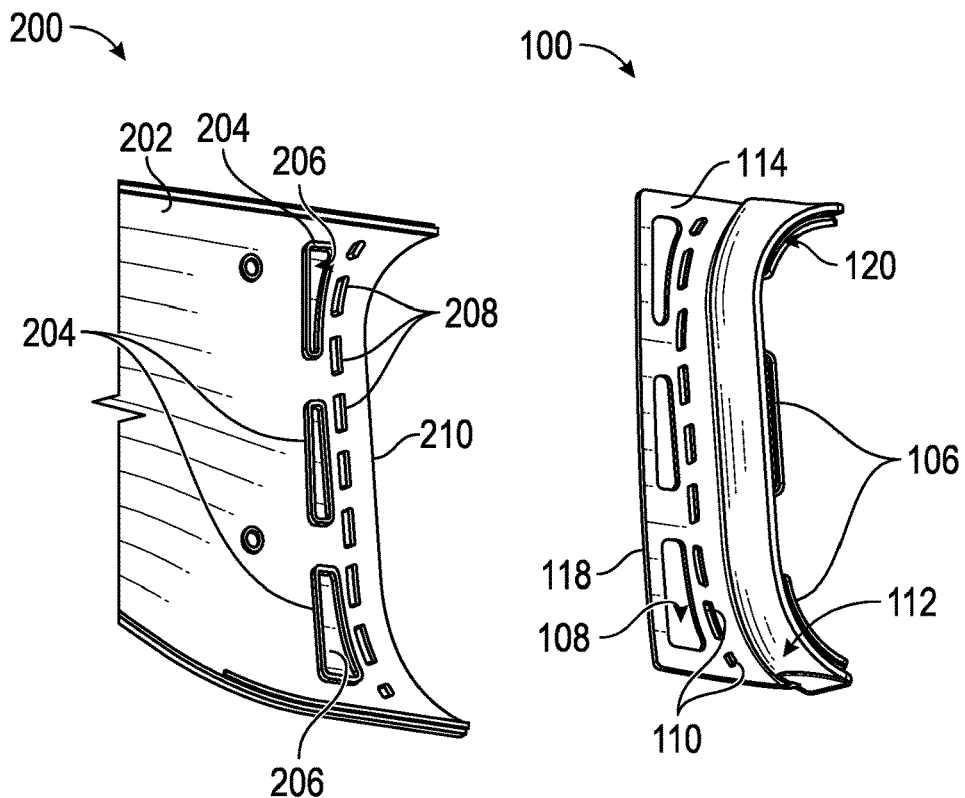
Figure 2B:
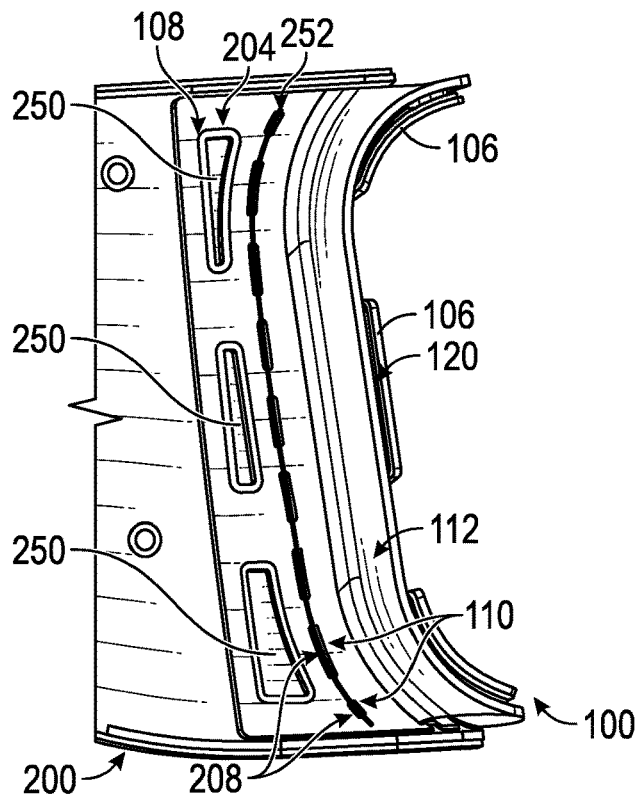
Figure 3A:
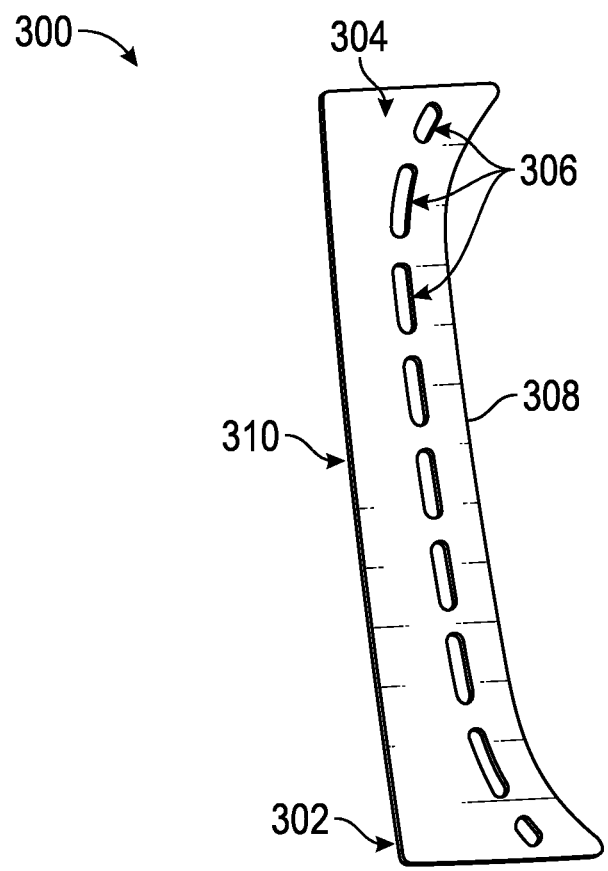
Figure 3B:
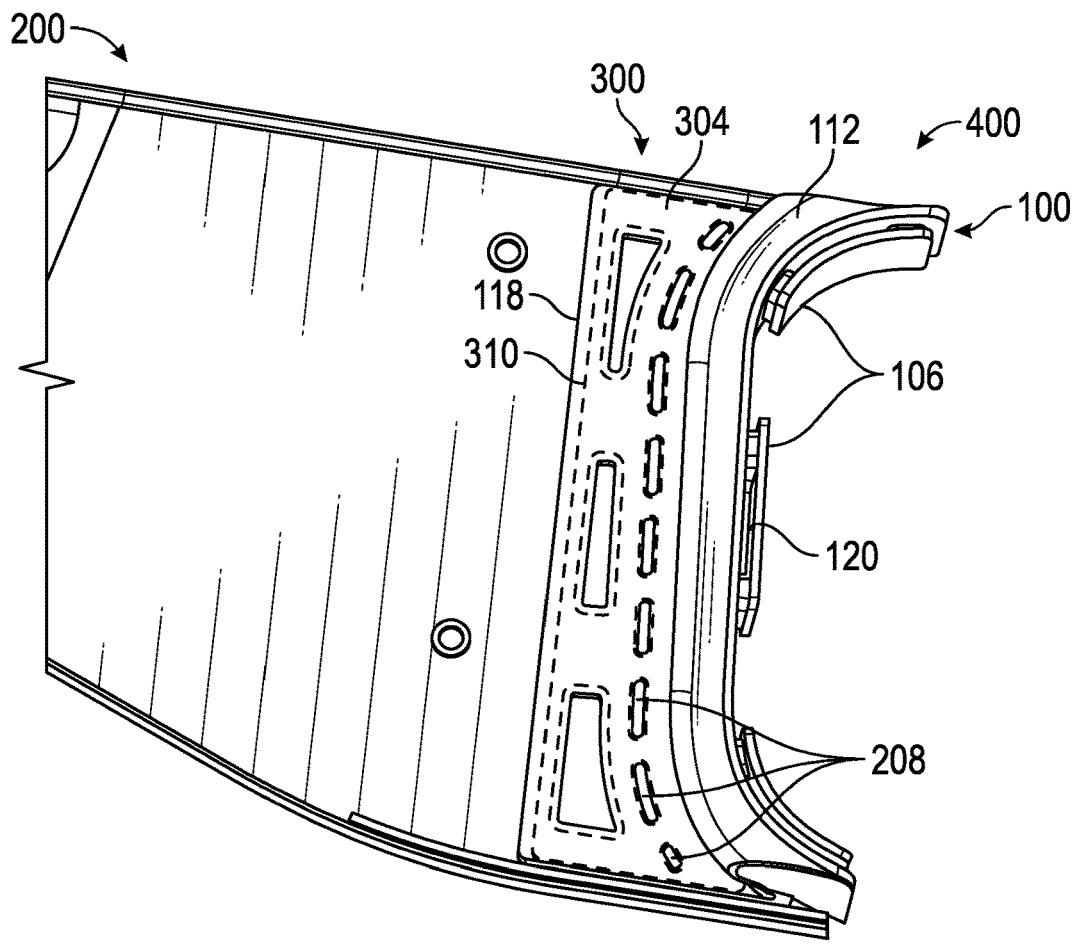
Figure 4A:
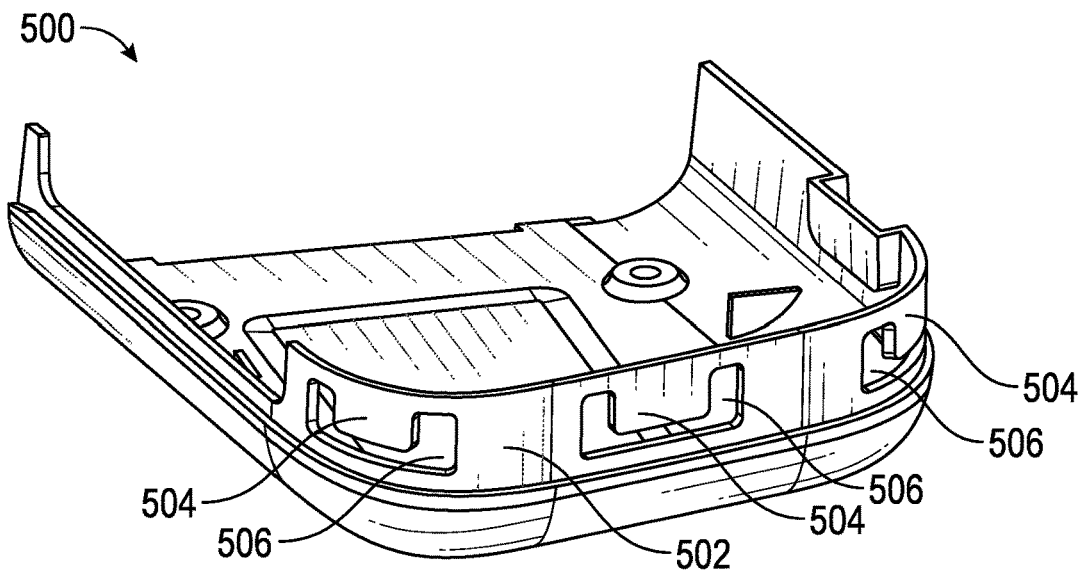
Figure 4B:
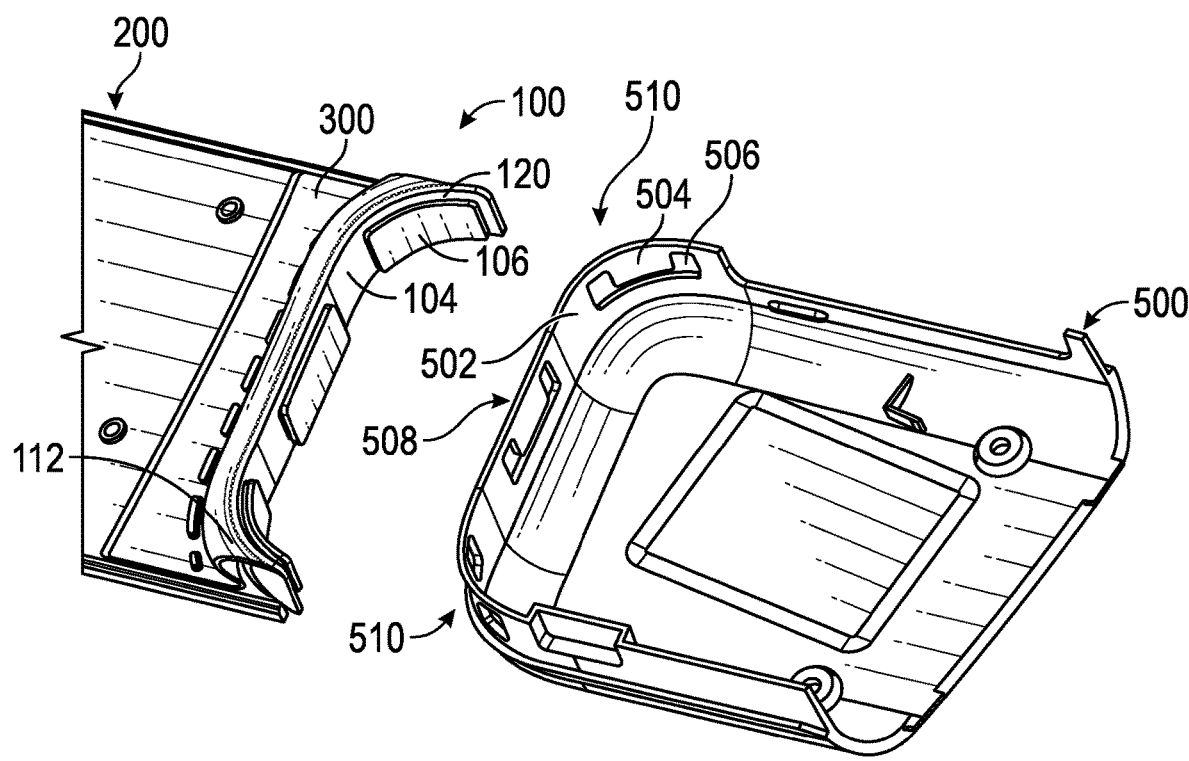
Figure 4C:
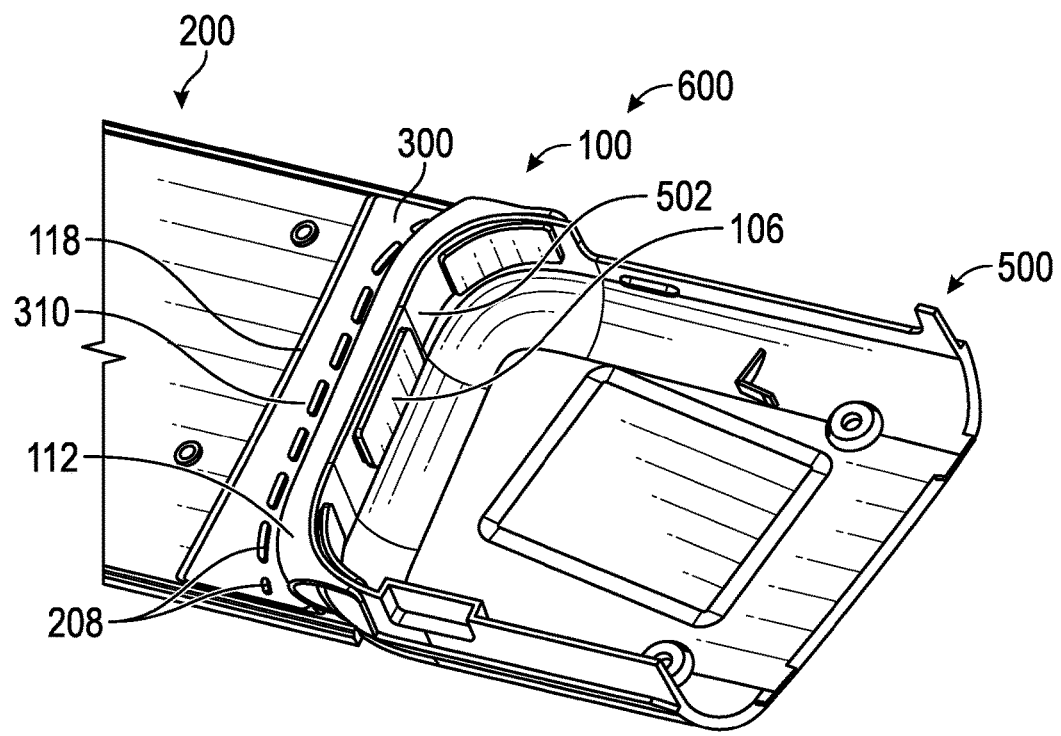
Figure 4D:
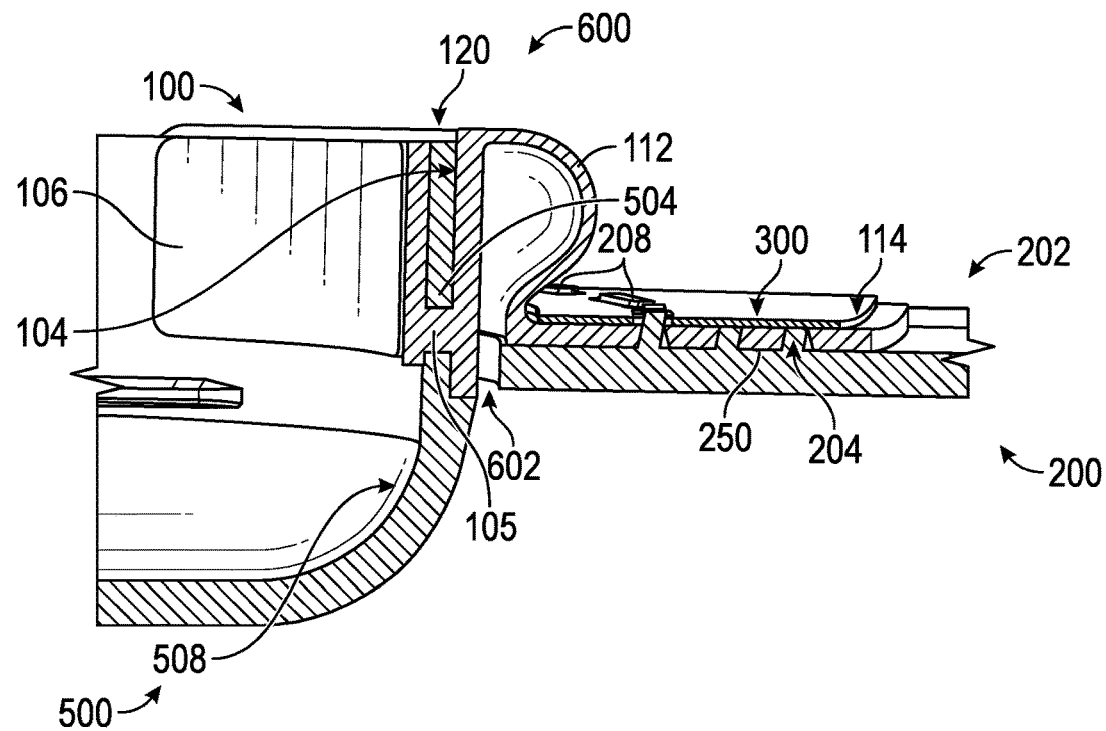
Figure 4E:
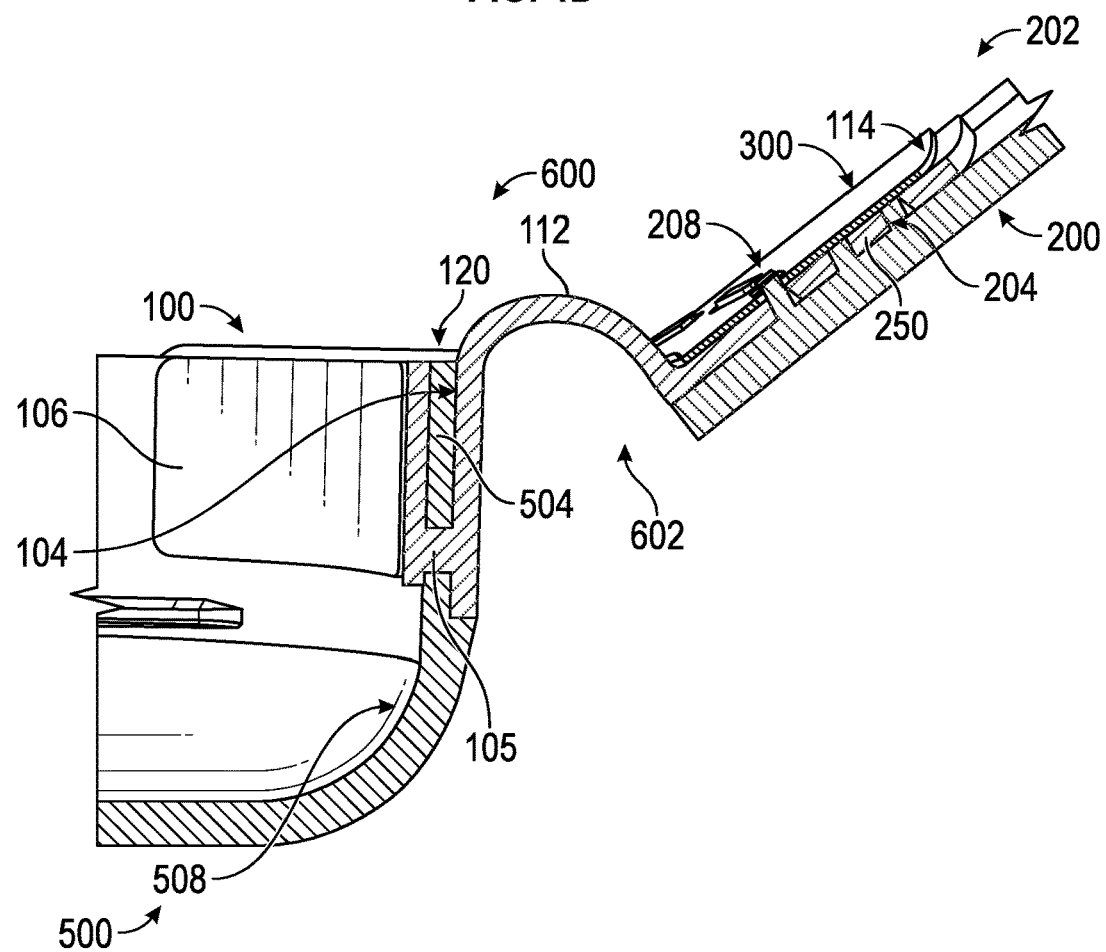
Figure 5:
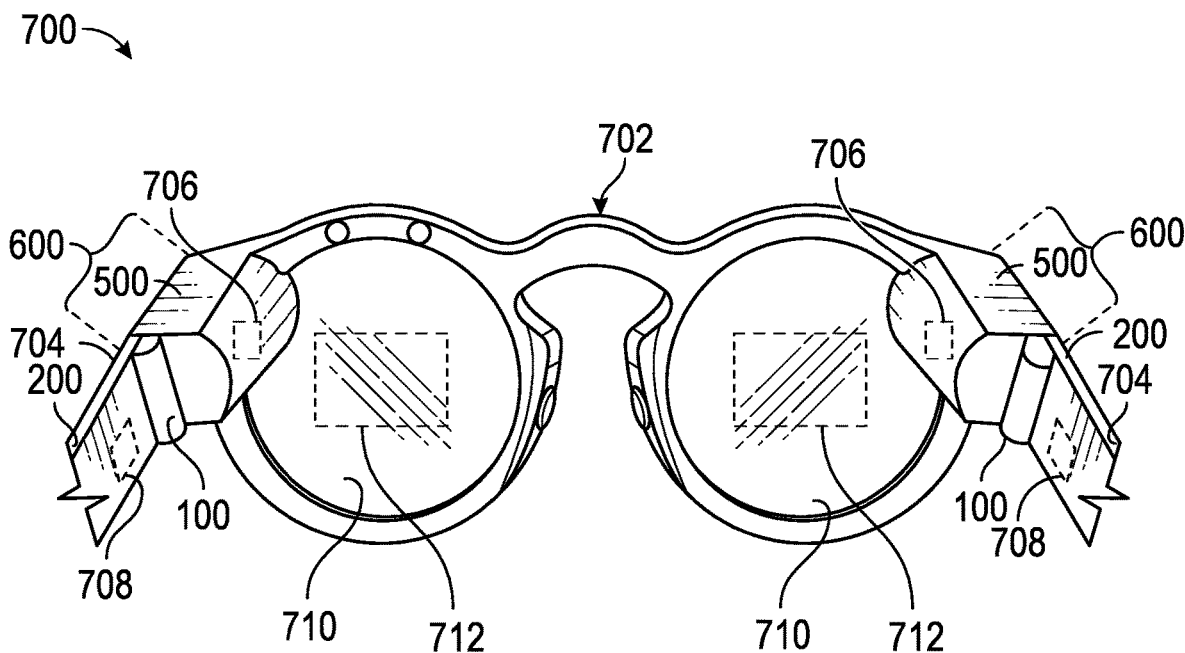
Figure 6:
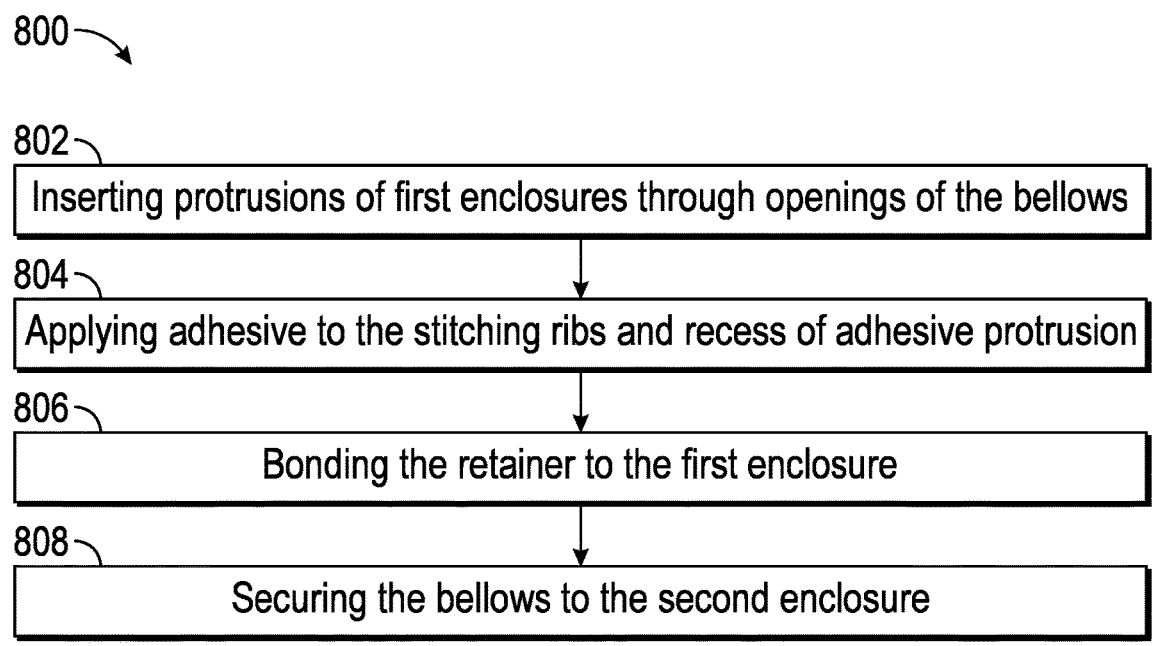

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1A is a bottom perspective view of a bellows;

FIG. 1B is a bottom view of the bellows illustrated in FIG. 1A;

FIG. 1C is a top perspective view of the bellows illustrated in FIG. 1A;

FIG. 2A is a perspective view of the bellows and a first enclosure before assembly;

FIG. 2B is a perspective view of the bellows coupled to the first enclosure with protrusions extending through respective openings;

FIG. 3A is a perspective view of a retainer;

FIG. 3B is a perspective view of the bellows secured to the first enclosure by the retainer using an adhesive;

FIG. 4A is a bottom perspective view of a second enclosure;

FIG. 4B is a top perspective view of the bellows and the first enclosure before coupling to the second enclosure of FIG. 4A;

FIG. 4C is a perspective view of the first enclosure and the bellows secured to the second enclosure;

FIG. 4D is a cross-sectional view of the first enclosure, the bellows, and the second enclosure;

FIG. 4E is a cross-sectional view of the first enclosure, the bellows, and the second enclosure in a bent position;

FIG. 5 is a perspective view of an electronic eyewear device where the temple includes the first enclosure and the frame includes the second enclosure; and FIG. 6 is a method of assembling a movable assembly with the bellows.

DETAILED DESCRIPTION

A movable assembly with an elastomer bellows forming a cosmetic covering and providing ingress protection of a dynamic opening between a pair of enclosures. On one side of the dynamic opening, the bellows is secured to an enclosure by protrusions of that enclosure that extend into mating openings in the bellows and a retainer that engages those protrusions. An adhesive secures the protrusions to the retainer to form a secure clamped connection of the bellows to the enclosure. On the other side of the dynamic opening, the bellows is secured to another enclosure without the use of fasteners or adhesives. Teeth in openings of the second enclosure are secured in a recessed channel of the bellows created by a protrusion and a flange. As the two enclosures move relative to one another, the bellows is stretched and compressed such that the dynamic opening between the two enclosures is cosmetically covered with ingress protection.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the movable assembly, associated components and any complete assemblies such as shown in any of the drawings, are given by way of example only, for illustration and discussion purposes. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any component as otherwise described herein.

Reference now is made in detail to the examples illustrated in the accompanying drawings and discussed below.

FIGS. 1A-1C depict a bellows 100 configured for cosmetic covering and ingress protection between two joined enclosures 200 and 500 (shown in FIGS. 4C and 4D). The bellows 100 includes a horizontally extending flange 101 having a first contact surface 102 and an opposing second contact surface 114 (FIG. 1C) configured to couple to the first enclosure 200. The bellows 100 includes a second portion 103 having a vertically extending mounting surface 104 configured to couple to the second enclosure 500. The flange 101 of the bellows 100 has adhesive openings 108 and stitching openings 110 that pass through the flange 101. In this example, the adhesive openings 108 include three separate openings that are elongated with round edges and configured to receive corresponding adhesive protrusions 204 of the first enclosure 200 (shown in FIG. 2B). A stitching opening 110 is smaller in size than an adhesive opening 108. In the illustrated example, the stitching openings 110 include nine separate openings that are elongated with round edges and configured to receive corresponding stitching ribs 208 (shown in FIG. 2B). The stitching openings 110 extend end-to-end and are arranged in a generally linear fashion. In other examples, the adhesive openings 108 may consist of a varying number of openings, such as a singular opening, or nine separate openings. The stitching openings 110 may also consist of a varying plurality of openings, such as three or six separate openings. The bellows 100 has a vertically extending contact surface edge 116 facing the first portion 101.

The second portion 103 of the bellows 100 includes a mounting surface 104 that has a set of vertically extending mounting protrusions 105 each having a flange 106. The mounting surface 104 includes a flat portion 107 with a curved portion 109 on each side of the flat portion. A recessed channel 120 is formed between the flange 106 and the mounting surface 104 (shown in FIG. 4D) to securely receive a respective tooth 504 of the second housing 500 (shown in FIG. 4A). The bellows 100 includes an outwardly bowing service loop 112 extending between the mounting surface 104 and the second contact surface 114 of the bellows. The service loop 112 can stretch or compress vertically and horizontally as the first enclosure 200 is moved with respect to the second enclosure 500. For example, the service loop 112 elongates when the first enclosure 200 is bent at a 90-degree angle with respect to the second enclosure 500 (shown in FIG. 4E). The service loop 112 is compressed when the first enclosure 200 is aligned with the second enclosure 500 as shown in FIG. 4C and FIG. 4D. The bellows 100 provides ingress protection and coverage of a dynamic opening 602 between the two enclosures 200 and 500 as shown in FIG. 4D to protect moving parts from debris, dust, and/or humidity. In one example, the bellows 100 is made of silicone and the bellows 100 is flexible, durable, and impermeable. However, other elastomers may be used for the construction of the bellows 100.

FIG. 2A depicts the first enclosure 200 and the bellows 100. In one example, the enclosure 200 encompasses various electronic components such as a printed circuit board or peripheral device as depicted in FIG. 5. The first enclosure 200 has an interface surface 202 having the adhesive protrusions 204 and stitching ribs 208 extending from the interface surface 202. The adhesive protrusions 204 include three separate protrusions that are elongated with round edges and are configured to pass through the adhesive openings 108 of the bellows 100.

The adhesive protrusions 204 each have a raised perimeter edge forming a recess 206. The stitching ribs 208 are configured to pass through the corresponding stitching openings 110 of the bellows 100. Each recess 206 is configured to receive a first adhesive 250 (shown in FIG. 2B) to bond the first enclosure 200 to a retainer 300 with the flange 101 of the bellows 100 sandwiched between (shown in FIG. 3B). In other examples, the adhesive protrusions 204 may consist of a varying number of openings such as a singular opening, or nine separate openings. The stitching ribs 208 may also consist of a varying plurality of openings such as three or six separate openings.

FIG. 2B illustrates the bellows 100 coupled to the first enclosure 200. The adhesive protrusions 204 pass through the corresponding adhesive openings 108, and the stitching ribs 208 pass through the respective stitching openings 110 to securely couple the bellows 100 to the first enclosure 200. In one example, the openings 108 and 110 are stretched for the protrusions 204 and 208 to pass through the respective openings 108 and 110. The stretching produces elastic forces in openings 108 and 110 that are exerted around the respective protrusions 204 and 208 to further secure the bellows 100 to the first enclosure 200 by a mechanical fit. FIG. 2B illustrates the first adhesive 250 applied to fill the recess 206 of the adhesive protrusions 204, and a second adhesive 252 applied as a strip that intertwines the stitching ribs 208. In one example, the adhesives 250 and 252 are ultraviolet light (UV) curable adhesives. Other adhesives can also be used. A mounting surface edge 210 of the first enclosure 200 aligns with a contact surface edge 116 of the bellows 100 when the first enclosure 200 is coupled to the bellows 100. The stitching ribs 208 disposed in the stitching openings 110 inhibit sliding movement of the bellows 100 with relation to the first enclosure 200.

FIG. 3A depicts the retainer 300. The retainer 300 is used to secure the bellows 100 to the first enclosure 200 by disposing the bellows 100 between the first enclosure 200 and the retainer 300 as seen in assembly 400 shown in FIG. 3B. In one example, the retainer 300 is made of a plastic that has a high bond strength to adhesives 250 and 252. However, the retainer 300 may also be made of metal or other materials that possess adequate bonding characteristics to adhesives 250 and 252. The retainer 300 has stitching openings 306 extending through a contact surface 302 and an outer surface 304 of the retainer 300. A stitch opening 306 is identical in dimension to and aligns with a corresponding stitching opening 110 of the bellows 100. The stitching openings 306 are configured to receive the stitching ribs 208.

FIG. 3B depicts the assembly 400 with the bellows 100 secured and disposed between the first enclosure 200 and the retainer 300. In the assembly 400, the stitching ribs 208 are disposed between the stitching openings 110 and 306. A surface edge 308 of the retainer 300 is aligned with the mounting surface edge 210 of the first enclosure 200 and the contact surface edge 116 of the bellows 100. An edge 118 of the flange 101 of the bellows 100 is parallel to an edge 310 of the retainer 300. The retainer 300 is secured to the first enclosure 200 using adhesives 250 and 252 (shown in FIG. 2B). The adhesive 252 secures the stitching ribs 208 to the stitching openings 306 while the adhesive 250 secures the adhesive protrusions 204 of the first enclosure 200 to the contact surface 302 of the retainer 300. The stitching ribs 208 disposed in the stitching openings 110 and 306 inhibit sliding movement of the retainer 300 and the bellows 100, respectively, with relation to the first enclosure 200.

In one example, the first and second enclosures 200 and 500 are made of plastic, while the bellows 100 is made of silicone which has a poor bond strength with most adhesives. This makes it difficult to directly bond the bellows 100 to the first enclosure 200 in an efficient way. The retainer 300 is made of plastic or another material that exhibits better bonding qualities to the adhesive 250 or 252 as compared to silicone or other elastomers. The retainer 300 bonded with adhesives 250 and 252 to the first enclosure 200 with the bellows 100, which is disposed between the retainer 300 and enclosure 200, provides an attachment solution that firmly and securely couples the bellows 100 to the first enclosure 200 in a very low-profile stack up. In another example, the enclosures 200 and 500 are made of metal.

FIG. 4A depicts a perspective view of the second enclosure 500. The second enclosure 500 has a mounting surface 502 with a set of openings 506 that have teeth 504 extending into the opening 506. The mounting surface 502 includes a flat portion 508 with a curved portion 510 on either side. The mounting surface 502 is complimentary to the shape of the mounting surface 104 of the bellows 100. The set of openings 506 include three separate rectangular openings with rounded edges and a respective rectangular tooth 504 extending into the opening 506. The dimensions of the teeth 504 are complimentary to the recessed channel 120 of the bellows 100. In other examples, the openings 506 may consist of a varying number of openings, such as a singular opening or four openings.

FIG. 4B is a perspective view of the second enclosure 500 with reference to the assembly 400. The openings 506 of the second enclosure 500 are configured to receive the protrusions 105 and flanges 106 of the bellows 100. The teeth 504 of the openings 506 are configured to fit into the recessed channel 120 of the bellows 100 to securely couple the second enclosure 500 to the bellows 100.

FIG. 4C illustrates a perspective view of a movable assembly 600 comprising the assembly 400 coupled to the second enclosure 500. The protrusions 105 and flanges 106 are inserted into the openings 506 of the second enclosure 500 with the teeth 504 inserted into the respective recessed channel 120 of the bellows 100 resulting in the mounting surface 104 of the bellows 100 to abut and be flush with the mounting surface 502 of the second enclosure 500. The flanges 106 are flush against an interior surface 508 of the second enclosure 500 (shown in FIG. 4D) preventing movement between the bellows 100 and the second enclosure 500. In one example, the protrusion 105 and flanges 106 are folded and compressed for insertion into the openings 506 of the second enclosure 500. After the insertion, the protrusion 105 and flanges 106 return to their resting state, thereby securing the bellows 100 to the second enclosure 500. In this example, the bellows 100 may be secured to the second enclosure 500 without the use of adhesives or fasteners.

FIG. 4D illustrates a cross sectional view of the movable assembly 600 at the center of a corner opening 506 of the second enclosure 500. The respective tooth 504 is disposed in the respective recessed channel 120 formed by the respective flange 106, the mounting surface 104, and protrusion 105 to secure the second enclosure 500 to the bellows 100. The stitching ribs 208 pass through the bellows 100 and retainer 300 via the stitching openings 110 and 306, respectively. The adhesive protrusion 204 extends through the bellows 100 and is flush with the second contact surface 114 of the bellows 100. The adhesive 250 fills the recess 206 to bond the first enclosure 200 to the retainer 300. The overall stack of the movable assembly 600 is space efficient with a low profile. The elastomer material of the bellows 100 with the service loop 112 allows for movement between the first enclosure 200 and second enclosure 500. The bellows 100 provides ingress protection and cosmetic coverage of a dynamic opening 602 between the two enclosures 200 and 500.

FIG. 5 depicts an electronic eyewear device 700 having a frame 702 and temples 704, where the temples 704 include the first enclosure 200 and the frame 702 includes the second enclosure 500. The frame 702 includes at least one electronic component 706, such as a processor, and the temple 704 includes at least one second electronic component 708, such as a peripheral device operable with the processor. The frame 702 supports optical elements 710 that each include a display 712 configured to generate a viewable image, such as an augmented reality (AR) virtual image. The movable assembly 600 forms a hinge coupling the frame 702 to the temple 704. The bellows 100 is disposed over a gap between the frame 702 and the temple 704.

FIG. 6 is a flow diagram of a method 800 for assembling the movable assembly 600.

At block 802, the adhesive protrusions 204 of the first enclosure are inserted into the adhesive openings 108 of the bellows 100, and the stitching ribs 208 are inserted into the stitching openings 110 of the bellows 100. In one example, the openings 108 and 110 are stretched to fit around their respective protrusions 204 and stitching ribs 208.

At block 804, the adhesive 250 is applied to fill the recesses 206, and a bead of the adhesive 252 is applied to intertwine between the stitching ribs 208. In one example, the adhesives 250 and 252 are UV curable adhesives.

At block 806, the stitching ribs 208 are disposed through the stitching openings 306 of the retainer 300. The adhesive 252 adheres to the retainer 300 between the stitching openings 306 and the stitching ribs 208. The adhesive 250 adheres to the contact surface 302 of the retainer 300 and the recess 206. The adhesives 250 and 252 are then cured or set to bond the retainer 300 to the first enclosure 200. In one example, the adhesives 250 and 252 are UV curable adhesives and the step of curing the adhesives 250 and 252 includes exposing the adhesives to UV light.

At block 808, the bellows 100 is secured to the second enclosure 500. The protrusions 105 and flanges 106 of the bellows 100 are inserted into the respective openings 506 of the second enclosure 500. The teeth 504 of the second enclosure 500 are inserted into the respective recessed channels 120 of the bellows 100. The bellows 100 is secured to the second enclosure 500 without the use of adhesives or fasteners.

What is claimed is:

1. A movable assembly comprising:
    a first enclosure comprising a plurality of protrusions;
    a second enclosure spaced from the first enclosure;
    a bellows extending between the first enclosure and the second enclosure, the bellows comprising a first portion adjacent the first enclosure and a second portion adjacent the second enclosure, the first portion comprising a plurality of openings that receive the plurality of protrusions of the first enclosure wherein the plurality of protrusions includes a first set of protrusions and a second set of protrusions, and the plurality of openings includes a first set of openings corresponding to the first set of protrusions and a second set of openings corresponding to the second set of protrusions, wherein each protrusion of the first set of protrusions comprises a recess, and
    a retainer coupled to the plurality of protrusions received by the plurality of openings in the first portion; and
    an adhesive disposed in the recesses and coupling the first enclosure to the retainer.

2. The movable assembly of claim 1, wherein the retainer includes a first set of retainer openings corresponding to the first set of openings in the first portion of the bellows and a continuous surface corresponding to the second set of openings in the first portion of the bellows.

3. The movable assembly of claim 1, wherein the retainer is coupled to the first set of protrusions by a mechanical fit and to the second set of protrusions by adhesive.

4. The movable assembly of claim 1, wherein the second set of protrusions are smaller in size and greater in number than the first set of protrusions.

5. The movable assembly of claim 1, wherein the bellows further comprises a service loop configured to extend when the second enclosure is moved with respect to the first enclosure.

6. The movable assembly of claim 5, wherein the service loop comprises an elastomer membrane bowing outwardly from an opening between the first enclosure and the second enclosure.

7. The movable assembly of claim 5, wherein the bellows provide ingress protection of a space between the first enclosure and the second enclosure.

8. The movable assembly of claim 1, further comprising an electronic eyewear device having a frame and a temple, wherein the temple comprises the first enclosure and the frame comprises the second enclosure.

9. A movable assembly comprising:
a first enclosure comprising a plurality of protrusions;
a second enclosure spaced from the first enclosure;
a bellows extending between the first enclosure and the second enclosure, the bellows comprising a first portion adjacent the first enclosure and a second portion adjacent the second enclosure, the first portion comprising a plurality of openings that receive the plurality of protrusions of the first enclosure, wherein the second portion of the bellows further comprises a flange and the second enclosure comprises an opening receiving the flange;
wherein the bellows further comprises a channel formed by the flange, wherein the opening of the second enclosure further comprises a tooth disposed in the channel of the flange that secures the flange in the opening of the second enclosure; and
a retainer coupled to the plurality of protrusions received by the plurality of openings in the first portion.

10. The movable assembly of claim 9, wherein the second enclosure is coupled to the second portion of the bellows without fasteners or adhesive.

11. A method of assembling a movable assembly, the movable assembly having a first enclosure comprising a plurality of protrusions, a second enclosure spaced from the first enclosure, a bellows extending between the first enclosure and the second enclosure, the bellows comprising a first portion adjacent the first enclosure and a second portion adjacent the second enclosure, the first portion comprising a plurality of openings configured to receive the plurality of protrusions of the first enclosure, wherein the plurality of protrusions includes a first set of protrusions and a second set of protrusions, and the plurality of openings includes a first set of openings corresponding to the first set of protrusions and a second set of openings corresponding to the second set of protrusions, wherein each protrusion of the first set of protrusions comprises a recess, and a retainer configured to couple to the plurality of protrusions received by the plurality of openings in the first portion, the method comprising;
coupling the bellows first portion to the first enclosure by inserting the plurality of protrusions of the first enclosure into the plurality of openings of the bellows;
coupling the retainer to the plurality of protrusions received by the plurality of openings in the first portion; and
disposing an adhesive in the recesses to couple the first enclosure to the retainer.

12. The method of claim 11, wherein the retainer includes a first set of retainer openings corresponding to the first set of openings in the first portion of the bellows and a continuous surface corresponding to the second set of openings in the first portion of the bellows.

13. The method of claim 11, wherein the retainer is coupled to the first set of protrusions by a mechanical fit and to the second set of protrusions by adhesive.

14. The method of claim 11, wherein the bellows further comprises a service loop configured to extend when the second enclosure is moved with respect to the first enclosure.

15. The method of claim 14, wherein the movable assembly further comprises an electronic eyewear device having a frame and a temple, wherein the temple comprises the first enclosure and the frame comprises the second enclosure.

* * * * *